United States Patent [19]

Sawyer

[11] 4,287,473
[45] Sep. 1, 1981

[54] NONDESTRUCTIVE METHOD FOR DETECTING DEFECTS IN PHOTODETECTOR AND SOLAR CELL DEVICES

[75] Inventor: David E. Sawyer, Rockville, Md.

[73] Assignee: The United States of America as represented by the United States Department of Energy, Washington, D.C.

[21] Appl. No.: 42,462

[22] Filed: May 25, 1979

[51] Int. Cl.³ .............................................. G01R 31/26
[52] U.S. Cl. ............................ 324/158 R; 324/158 D
[58] Field of Search ............ 324/158 R, 158 D, 73 R; 29/574; 356/237

[56] References Cited

U.S. PATENT DOCUMENTS 4,051,437  9/1977  Lile et al. ......................... 324/158 D

*Primary Examiner*—Ernest F. Karlsen
*Attorney, Agent, or Firm*—Paul Devinsky; Michael F. Esposito; Richard G. Besha

[57] ABSTRACT

The invention described herein is a method for locating semiconductor device defects and for measuring the internal resistance of such devices by making use of the intrinsic distributed resistance nature of the devices. The method provides for forward-biasing a solar cell or other device while it is scanning with an optical spot. The forward-biasing is achieved with either an illuminator light source or an external current source.

12 Claims, 7 Drawing Figures

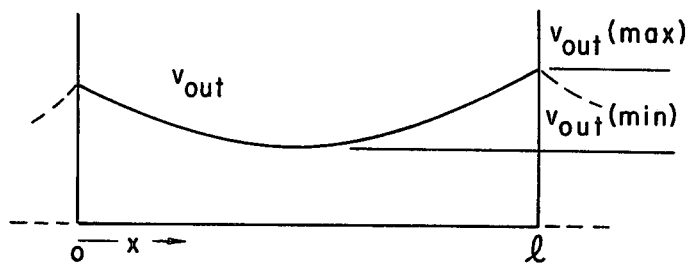
Fig.4
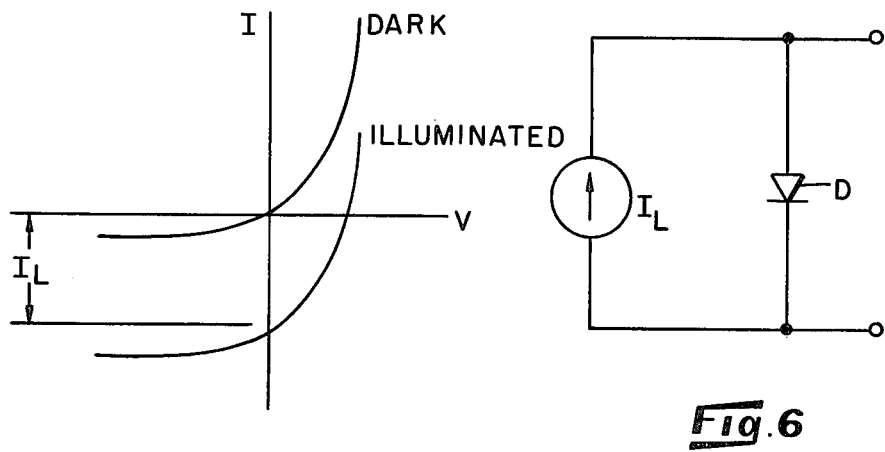
Fig.5
Fig.6

NONDESTRUCTIVE METHOD FOR DETECTING DEFECTS IN PHOTODETECTOR AND SOLAR CELL DEVICES

The invention described herein relates generally to a method for locating defects in light sensitive semiconductor devices by utilizing the intrinsic internal resistances of such devices when they are forward-biased. It is a result of a contract with the United States Department of Energy.

In the testing of active semiconductor devices, it is known that non-destructive scanning techniques can be used to map d.c. and high frequency gain variations in transistors, to reveal areas of a device operating in a non-linear manner, to electronically map temperatures within devices and to determine internal logic states in ICs. See *Laser Scanning of Active Integrated Circuits and Discrete Semiconductor Devices,* D. E. Sawyer, D. W. Berning and D. C. Lewis; Solid State Technology/- June, 1977. The prior art techniques simply rely on the effects of directing light of an energy greater than that of the band gap on the material under investigation to create electron-hole pairs within the material which can then be collected as a photocurrent. Provided the photon energy of the light is less than a few times the band gap energy of the material, there would be no degradation of the material.

Visible or near-infrared radiation incident on semiconductor materials useful for solar cells, e.g., silicon, creates electron-hole pairs with a generation rate which exponentially trails off with distance into the material. The penetration depends on the wavelength of the incident radiation. The visible light from a 0.633-$\mu$m laser has a characteristics penetration depth of about 3 $\mu$m in silicon. Because most modern silicon devices have their active regions within a few micrometers of the surface, a 0.633-$\mu$m laser is quite effective in exciting active regions of silicon devices to determine internal logic states in ICs, to map transistor gain variations, and to reveal device regions which are operating in a non-linear manner.

By changing the wavelength of the laser light to 1.15-$\mu$m, the characteristic penetration depth in silicon becomes several centimeters, and its precise value is a function of the silicon temperature. This sensitivity allows one to determine the spatial temperature variations in functioning devices. Utilizing this sensitivity, one has an electronic technique for thermal mapping of devices which appears to have a number of advantages over the more traditional methods. See D. E. Sawyer and D. W. Berning, "*Thermal Mapping of Transistors With a Laser Scanner,*" Proc. IEEE, Vol. 64 (1976). Another application uses the penetrating infrared radiation to photogenerate carriers deep within silicon devices; this capability allows the operation of devices that are bonded face down (e.g., beam lead devices) to be examined. A third application uses the penetrating radiation in conjunction with a reflected-light photocell to examine the interface between a semiconductor chip or wafer and the substrate.

Except for grossly deficient solar cells, most of the previous attempts to use an optical spot scanner to reveal cell defects such as cracks and poor metallization have not been very successful. The invention disclosed herein addresses the deficients of the prior art by disclosing a method of using an optical scanner to reveal cracks and such solar cell quantities as emitter sheet resistance and portions of the metallization making poor ohmic contact to the underlying emitter.

Accordingly, it is a primary object of this invention to provide a method of detecting cracks in solar cells.

It is a further object of this invention to provide a method of detecting metallization defects in solar cells.

It is a further object of this invention to provide a means for revealing solar cell back contact regions which are electrically deficient.

It is a still further object of this invention to provide a method of detecting means emitter sheet resistance and emitter sheet resistance variations in solar cells.

It is also an object of this invention to provide a method for pinpointing resistive losses in solar cell structures.

These and other objects or advantages will become apparent upon reading the following detailed description.

SUMMARY OF THE INVENTION

To achieve the foregoing objects and in accordance with the invention described herein a method for locating semiconductor device defects and for measuring internal resistance by making use of the intrinsic distributed resistance nature of such devices is provided whereby the solar cell is forward-biased while scanning with the optical spot. The low-frequency small-signal equivalent circuit of the biased and scanned cell is a three-dimensional resistive array, and the light spot is represented by a current generator moving within the array as the spot scans the cell. The array components are normally made up of the cell "emitter" sheet resistance and the distributed resistance for the p-n junction. This distributed resistance is the local slope of the voltage-current for each increment in cell area. A simplified, two-dimensional analysis of this array demonstrates that cracks, and regions of poor metallization, can be pinpointed while scanning the cell if it is adequately forward-biased. The technique is nondamaging; it requires no electrical contacts to the cell other than those already present, and it can be used on encapsulated or nonencapsulated cells in almost any laboratory or test environment.

BRIEF DESCRIPTION OF THE DRAWINGS

FIG. 4 is a sketch of output voltage for a representative ($\beta l/2$) value of 1.30.

FIG. 5 is the I–V characteristics for a dark and illuminated ideal solar cell.

FIG. 6 is an equivalent circuit for an idealized solar cell.

DETAILED DESCRIPTION OF THE INVENTION

Figure 1:
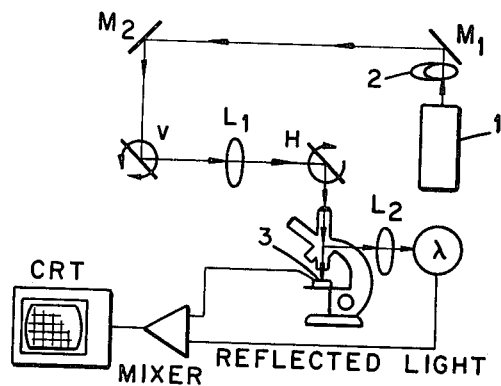
FIG. 1 is a schematic of the scanner used to detect defects in solar cells.

All semiconductor materials are photosensitive as a part of their basic nature. If a barrier semiconductor device is illuminated by a spot of light in the vicinity of a device rectifying-barrier, the current-carriers (electrons and holes) produced by the light will diffuse to the barrier, and separation of the electrons and holes will occur. The rectifying barrier may take many forms, e.g., Schottky, homojunction and heterojunction p-n, conducting oxide-semiconductor, and metal-insulator-semiconductor. The charge-separation effect, as is well-known, can be represented in an electrical equivalent circuit with a current generator across the barrier and located at the region of charge separation. With appropriate semiconductor terminals connected to a signal load resistor, and with the light spot moving over the semiconductor surface, one can map the strength of the equivalent current generator. However, the signal source, being a current source in the equivalent circuit, will produce a voltage across the load resistor proportional only to the load resistor value and this voltage will be independent of the resistance between the semiconductor terminals and the illuminated region. This means that the signal voltage will not depend on the nature or value of the resistance between the point of photogeneration and the device terminals, i.e., structural defects such as cracks, and regions having poor contact metallization will not be localized. The innovative concept embodied in the present invention is to deliberately make use of the fact that the barrier incremental resistance (which in the prior-art method of light-scanning could be neglected and led to the simple equivalent circuit described) can be adjusted to any desired value by forward-biasing the device while the device is scanned. This can be accomplished by shining a bias light more-or-less uniformly on the device or by use of an external electrical current source. This forward-biasing transforms the simple series-type equivalent circuit of the device into one resembling a resistive, signal-attenuating, distributed network. The signal load voltage is no longer independent of the resistive nature of the device structure, and device defects can be revealed.

This concept can be used on barrier solar cells to reveal cell cracks, regions of poor metallization, to detect deviations of sheet resistance in the cell "emitter" regions, and to detect poor back-contact regions. The technique is nondamaging, it requires no electrical contacts to the semiconductor other than those already present, it can be used in almost any laboratory or test environment, and it does not require the services of a skilled operator. The concept can also be used to determine the efficacy of device design and to aid in the design of improved devices and is suitable for cell inspection, for degradation studies, for failure analysis, and for understanding the details of solar cell operation. This invention may also be applied to devices other than solar cells, including a variety of semiconductor transistor and diode types. Additionally, it may be used on specially constructed structures, e.g., "test structures," to determine the suitability of a design, or fabrication procedure, intended to be used in a working semiconductor device.

As mentioned above, the invention makes use of the distributed nature of the cell resistance under forward-bias conditions. The low-frequency small-signal equivalent circuit of the biased and scanned cell is a three-dimensional resistive array, and the scanning light spot is represented by a current generator moving within the array as the spot scans the cell. The array components are normally made up of the cell emitter sheet resistance and the distributed resistance for the p-n junction. This distributed resistance is the local slope of the voltage-current curve for each increment of device area. Calculations are presented below to show that this detection method, with the cell adequately forward-biased, will reveal all the desired cell qualities.

Cell forward-biasing can be achieved in either of the following ways, or by a combination of both: (1) uniform, unmodulated illumination of the cell with no steady-state current in the cell load, or (2) connecting the cell to a current source. The explanation of the invention is facilitated by reference to FIGS. 1, 2 and 3.

FIG. 1 depicts the scanner embodiment of the invention.

Scanning light is preferably provided by a low power laser (1). The invention contemplates the use of a He-Ne cw laser but as will be apparent to the artisan, other equivalent light sources can be used. Where the material being studied is silicon, it is desirable that the wavelength of the laser be 0.633 $\mu$m as explained above.

Mirrors $M_1$ and $M_2$ are used to fold the output from the laser so that the scanner can be made more compact and rugged, but as will be appreciated by the artisan, the light can be directed on the semiconductor by other equivalent means.

The analyzer (2) shown at the output of the laser in FIG. 1 is used to control the intensity of the radiation delivered to the device under test. Since the output of the laser is plane polarized, rotation of the analyzer can vary the transmissivity from 0 to 1.

Mirrors V and H are electrically driven to provide orthogonal deflections of the light beam. Light from mirror H passes through a microscope and is focused to a spot on the material to be examined. The same electrical signals that drive mirrors V and H also deflect a spot on a cathode ray display (CRT) screen in synchronism with the laser scan. The lens $L_1$ between the vertical and horizontal deflection mirrors refocuses the vertical deflection from V onto the horizontal mirror, H. The beam diverges from the horizontal deflection mirror, H, to form the scanning raster. The scan raster typically covers the same field of view that can be seen with the eye when the microscope is used in its customary manner. Light reflected from the specimen is used to identify the portion of the specimen being scanned. The reflected-light circuit uses a half-silvered mirror in the microscope which is an integral part of the microscope's vertical illuminator, a lens $L_2$, and a photocell ($\lambda$). Laser radiation reflected from any point on the specimen (3) is directed by the half-silvered mirror onto the lens and is focused to a fixed point on the photocell. The photocell signal modulates the display screen to present a picture of the device surface topography. Used this way, one could call the apparatus a "flying-spot microscope." The primary purpose of the reflected-light circuit is to permit correlation of the device response with surface features such as metallization areas. This is accomplished simply by mixing together the signals from the scanned specimen and the photocell. Alternatively, a color display screen can be used with the photocell signal fed into one color channel and the electrical signal(s) from the scanned specimen into the other(s).

Figure 2:
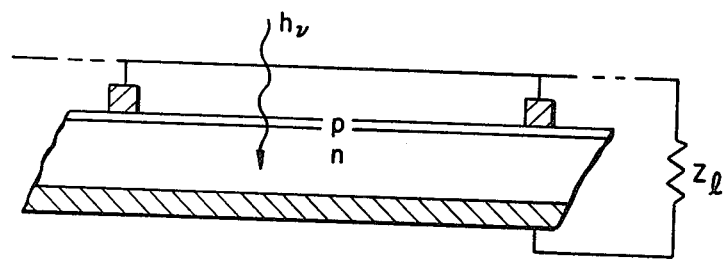
FIG. 2 is an end-on view of an idealized solar cell showing the portion between a contiguous pair of parallel metallization strips.
Figure 3:
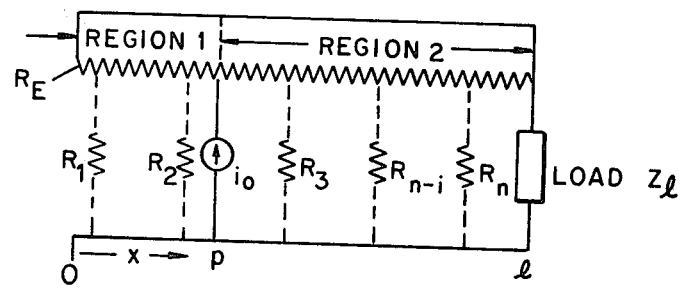
FIG. 3 is a one-dimensional electrical representation of FIG. 2 for the case of laser scanning with a line of light.
Figure 7:
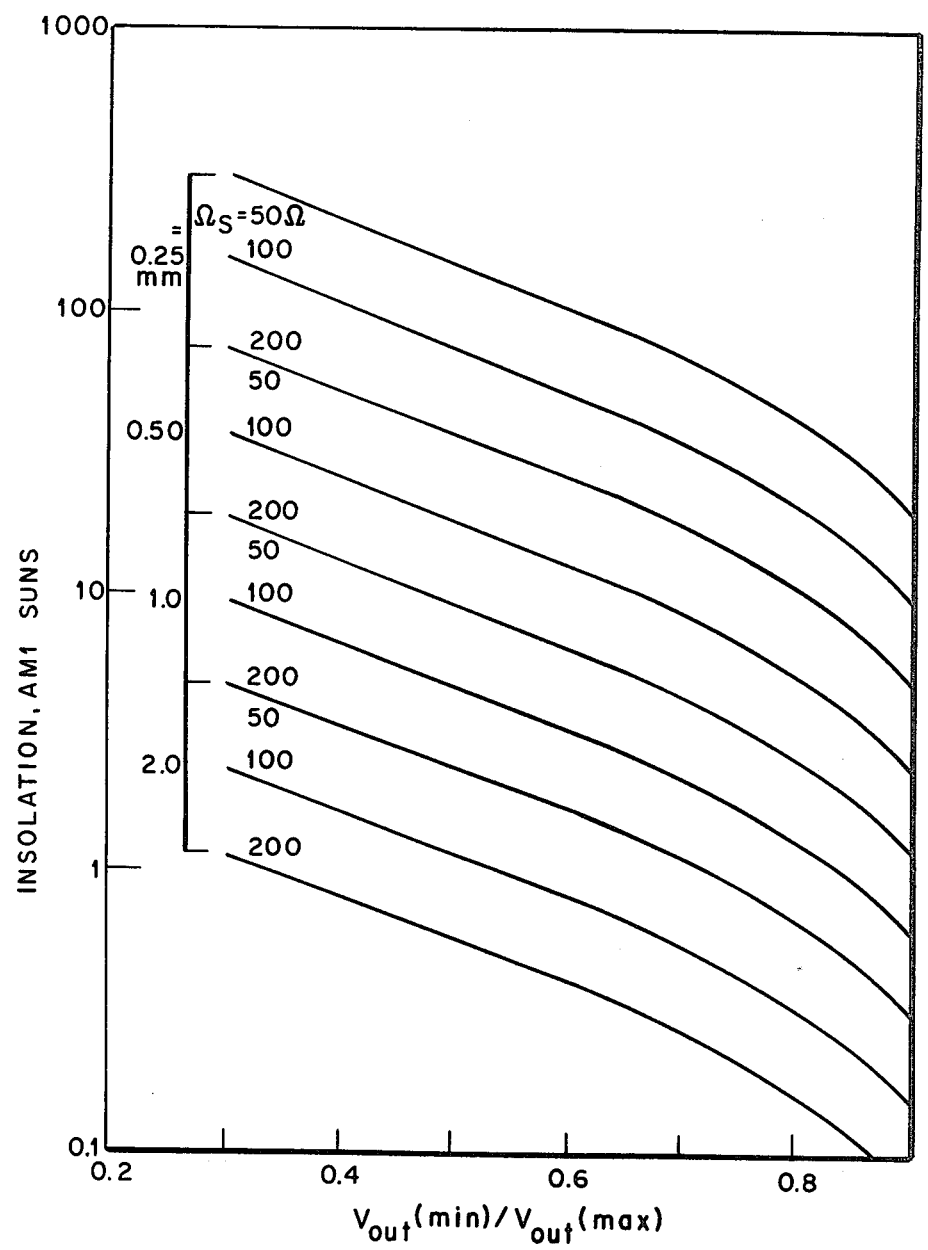
FIG. 7 is a plot of Air-mass-one isolation levels versus desired scanning sensitivity ratios for various combinations of cell stripe spacing and emitter sheet resistance.

FIG. 2 is an end-on view, not to scale, of an idealized solar cell showing the portion between a contiguous pair of (parallel) metallization stripes, and FIG. 3 is its one-dimensional electrical representation for the case of scanning with a line of light. In FIG. 3 the cell emitter is represented by the continuous resistance element Re, and the small-signal voltage-current ratios for the elemental diodes making up the cell between the stripes are represented by the discrete resistors connected with dotted lines ($R_1$-$R_n$). In the absence of significant shunting by the latter, the photocurrent will find its way to the load through one path or another. Thus, the load voltage (which can be displayed on a scanner screen), while it may vary from one light spot location to another due to variations in such quantities as local lifetime, will not be influenced by the proximity to a defect such as a region of poor metallization contact. In short, without significant internal shunting in a solar cell, the scanner does not reliably detect cell defects such as cracks, regions of poor contacting, regions of excessive emitter sheet resistance, etc., which may seriously influence cell reliability and conversion efficiency.

The values of the shunt resistances can be varied by varying the diode forward bias. For the simple case in which elemental diode is equivalent and all are biased to the same voltage, the shunt conductance per unit area is the same for all portions of the cell. With $\sigma_p$ representing this conductance, and $\Omega_s$ the emitter sheet resistance, the signal current and voltage for each increment of distance dx satisfy the pair of differential equations:

$$\frac{di(x)}{dx} = -v(x)\sigma_p \quad (1)$$

$$\frac{dv(x)}{dx} = -i(x)\Omega_s. \quad (2)$$

The solution of eqs (1) and (2) is found by differentiating eq (2) and substituting into eq (1).

$$\frac{d^2v(x)}{dx^2} - \beta^2 v(x) = 0 \quad (3)$$

where $$\beta \equiv (\Omega_s\sigma_p)^{\frac{1}{2}}. \quad (4)$$

The voltage across the load Z, i.e., the output voltage $v_{out}$ for the scanning light line at the arbitrary position $0 \leq p \leq 1$ is $$v_{out} = i_o Z l \frac{\{\sinh[\beta(l-p)] + \sinh(\beta l)\}}{\left\{\sinh(\beta l) + \frac{2\beta Z l}{\Omega_s}[\cosh(\beta l) - 1])\right\}}. \quad (5)$$

As the laser light line is swept from one grid stripe to another, $v_{out}$ undergoes a maximum-minimum-maximum excursion having the ratio $$\frac{v_{out}(\min)}{v_{out}(\max)} = \frac{1}{\cosh(\beta l/2)}. \quad (6)$$

Equation (5) is plotted in FIG. 4 for a representative value of ($\beta l/2$).

FIG. 4, and the determining equations, hold only for perfect cells. Cell defects are revealed when the laser scanning display is found to be different from that shown in FIG. 4. Defects in surface metallization are detected by observing the scanning photoresponse near the metallization region in question. In order for the photoresponse to achieve a common maximum value, such as that at $x=0$ and at $x=1$ in FIG. 4, the emitter metallization must be both electrically continuous to the cell output terminal and make a uniform ohmic contact to the underlying semiconductor. These two requirements are precisely those required of adequate metallization to a solar cell. Metallization regions which do not meet either of these conditions are indicated by a lowered photoresponse in their vicinity.

Cell cracks may be revealed, with the cell appropriately forward-biased, by discontinuities in the photoresponse as the laser spot sweeps across the crack. This behavior is consistent with predictions made using the resistive cell model shown in FIG. 3. A cell crack causes a break to occur in the resistor labeled Re.

The desired forward-biasing of the cell may be achieved by shining light on the cell. It is appropriate now to relate the shunt conductance $\sigma_p$ to the cell current and associated air-mass-one (AM1) isolation level. FIG. 5 shows the I-V characteristics for the dark and illuminated idealized solar cell and FIG. 6 its equivalent circuit representation. The well-known effect of shining light on the cell is to displace the I-V characteristics along the I-axis an amount equal to the external current which would exist if the diode were connected to a short circuit. This current will be designated $I_L$. An alternate description states that charge flows through the cell in the forward-bias direction. For the case discussed, and with uniform illumination, $I_L$ is equal to the product of the cell junction area and the cell current density $J_L$ due to illumination. In turn, $J_L$ is related to the cell voltage V and $J_o$, the junction saturation-current density, by $$J_L = J_o(e^{qV/kT} - 1). \quad (7)$$

In the scanning method described and illustrated in FIG. 1, the cell is d.c. open-circuited and illuminated by a constant light source while it is scanned with a much weaker (laser) source. The constant source, by forward-biasing the cell, produces a small-signal junction conductance per unit area readily calculated by differentiating eq (7)

$$\sigma_p = dJ_L/dV = (q/kT)(J_L + J_o). \quad (8)$$

The current $J_L$ will usually be several orders of magnitude larger than $J_o$, and so the quantity multiplying (q/kT) for all practical purposes is simply $J_L$. At room temperature, and with $J_L$ expressed in amperes per unit area, $$\sigma_p = 38.4 \; J_L \text{ siemens per unit area.} \quad (9)$$

The insolation level for a representative cell and measurement condition can be readily calculated. The assumed conditions are stripe separation, $l=2$ mm, and emitter sheet resistance, $\Omega_s = 50 \; \Omega/\square$; 0.9 is the value of $v_{out}(\min)/v_{out}(\max)$ judged to just yield adequate scanning sensitivity. From eqs (4) and (6), the $\sigma_p$ value required is 0.442 S/cm$^2$, and from eq (9), the required value of light-generated current is 11.5 mA/cm$^2$. The short-circuit photocurrent from a good quality silicon cell exposed to an insolation of one sun with an air-mass-one spectral distribution is about 38 mA/cm$^2$ [2]. Using this value, the required cell insolation level is found to be approximately 0.30 suns. In FIG. 6, required insolation levels are plotted versus desired scanning-sensitivity ratios for various combinations of stripe spacing and emitter sheet resistance. The insolation values required to give unambiguous v(min)/v(max) values of 0.5 for line-scanning nonconcentrator cell designs having l-values from 1 to 3 mm and $\Omega_s$ values from 50 to 200 $\Omega/\square$ can be achieved with an insolation source of 10 suns or less, according to this figure.

Noise and modulation of the light by, e.g., an inadquately filtered lamp power supply shoud be a minimum. One type of light source which satisfies the requirements is the quartz-halogen incandescent lamp.

The second embodiment disclosed to achieve the desired internal resistive shunting, by using an externally supplied current source, is conceptually simpler than flooding the cell with light.

The capacitance associated with the injection of minority carriers in forward-biased solar cells may severely limit the spot deflection rates allowable, when one employs the method to pin-point cell defects described above. One way of solving this problem is to reduce the RC time-constant of the cell and its load. This reduction can be accomplished by coupling the cell to the scanner display electronics with a transformer input. A transformer having an input impedance of 1.75Ω gives good results with the secondary connected to a 3.3-kΩ display screen input, and with a 9,000-μF electrolytic capacitor in series with the primary to block the cell d.c. voltage.

When the scanner is used for discrete transistor-like devices and ICs, a large scanning area is not needed, and the ability to achieve a scanning area 3 mm on a side is quite adequate. For solar cells, it is preferable to increase this value by at least an order of magnitude by modifying the scanner optics through replacing or supplementing the original microscope optical elements.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modifications as are suited to the particular use contemplated. It is intended that the scope of the invention be defined by the claims appended hereto.

What we claim is:

1. A method for detecting defects in semiconductor devices including:
    forward-biasing the semiconductor device with an illuminator;
    scanning the forward-biased semiconductor with a light spot;
    detecting the output voltage;
    mapping the device topography from the detected output voltage.

2. The method of claim 1 wherein the illuminator is uniform bias light.

3. The method of claim 1 whereby the step of forwarding-biasing further uses an external current source.

4. A method for detecting defects in semiconductor devices including
    forward-biasing the semiconductor device with a current source;
    scanning the forward-biased semiconductor with a light spot;
    detecting the output voltage;
    mapping the device topography from the detected output voltage.

5. The method of claim 4 where the current source is an external source.

6. The method of claims 1 or 3 whereby the output voltage is dependent upon the resistive nature of the material.

7. The method of claims 1 or 3 whereby the output signal reveals solar cell cracks.

8. The method of claims 1 or 3 whereby the output voltage reveals regions of poor metallization.

9. The method of claims 1 or 3 whereby the output voltage reveals electrically-deficient back-contact regions.

10. The method of claims 1 or 3 whereby the output voltage measures the mean sheet resistance of a cell emitter.

11. The method of claim 10 whereby the output voltage further measures the deviations from the mean sheet resistance.

12. A method for detecting defects in semiconductor devices including:
    forward biasing the semiconductor device;
    scanning the forward-biased semiconductor with a light spot;
    detecting the output voltage;
    mapping the device topography from the detected output voltage.

* * * * *